US010679227B2

(12) United States Patent
Sagade et al.

(10) Patent No.: US 10,679,227 B2
(45) Date of Patent: Jun. 9, 2020

(54) SYSTEMS AND METHODS FOR MAPPING ONLINE DATA TO DATA OF INTEREST

(71) Applicant: MasterCard International Incorporated, Purchase, NY (US)

(72) Inventors: Chinmay Sharad Sagade, Chesterfield, MO (US); Srinivas Kosaraju, Wildwood, MO (US); John Gerard Gamel, Lake Saint Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 934 days.

(21) Appl. No.: 14/935,053

(22) Filed: Nov. 6, 2015

(65) Prior Publication Data

US 2017/0132643 A1    May 11, 2017

(51) Int. Cl.
*G06Q 30/02* (2012.01)
*G06Q 50/00* (2012.01)

(52) U.S. Cl.
CPC ..... *G06Q 30/0202* (2013.01); *G06Q 30/0201* (2013.01); *G06Q 50/01* (2013.01)

(58) Field of Classification Search
None
See application file for complete search history.

(56) References Cited

U.S. PATENT DOCUMENTS

| 3,629,862 | A | * | 12/1971 | Chow | G06F 13/4234 |
| | | | | | 711/169 |
| 4,021,623 | A | * | 5/1977 | Suyderhoud | H04B 3/23 |
| | | | | | 379/406.11 |
| 8,775,431 | B2 | | 7/2014 | Jason | |
| 8,909,771 | B2 | | 12/2014 | Heath | |
| 2007/0198407 | A1 | * | 8/2007 | Winter | G06Q 20/102 |
| | | | | | 705/40 |
| 2010/0179951 | A1 | | 7/2010 | McPhail | |
| 2011/0087519 | A1 | * | 4/2011 | Fordyce, III | G06Q 30/02 |
| | | | | | 705/7.29 |
| 2012/0016948 | A1 | | 1/2012 | Sinha | |
| 2012/0185544 | A1 | | 7/2012 | Chang et al. | |
| 2012/0271829 | A1 | * | 10/2012 | Jason | G06Q 30/02 |
| | | | | | 707/740 |
| 2013/0297694 | A1 | | 11/2013 | Ghosh | |
| 2013/0298038 | A1 | | 11/2013 | Spivack et al. | |

(Continued)

FOREIGN PATENT DOCUMENTS

WO    WO-2009038285 A1 *    3/2009   ........... G06F 16/951

*Primary Examiner* — Kurtis Gills
*Assistant Examiner* — Akosua Kyereme-Tuah
(74) *Attorney, Agent, or Firm* — Armstrong Teasdale LLP

(57) ABSTRACT

A trend analysis computing device is provided. The computing device includes a receiver to receive online data, a trend determiner to determine a trend that is presently happening based on a word or a phrase included in the received online data, a processor to compare the determined trend with a dictionary database of the user to determine if the trend is of interest to the user, and, in response to determining the trend is a trend of interest, add additional data to the trend of interest based on the dictionary database, an analyzer configured to analyze the trend of interest, the added additional data, and user interest data, and generate impact data that the trend of interest is having on the user interest data, and a transmitter to transmit the impact data to the user.

19 Claims, 6 Drawing Sheets

(56) References Cited

U.S. PATENT DOCUMENTS

| | | |
|---|---|---|
| 2013/0304818 A1 | 11/2013 | Brumleve et al. |
| 2014/0081636 A1* | 3/2014 | Erhart .................... G06Q 50/01 |
| | | 704/236 |
| 2014/0136997 A1 | 5/2014 | Spivack et al. |
| 2014/0143013 A1* | 5/2014 | Pavlidis ............. G06Q 30/0202 |
| | | 705/7.31 |
| 2014/0278769 A1 | 9/2014 | McCandless et al. |
| 2015/0149494 A1 | 5/2015 | Jason |
| 2015/0254291 A1 | 9/2015 | Raikula et al. |

* cited by examiner

FIG. 4

| K | V | L |
|---|---|---|
| iPadAir2 | Apple | GLOBAL |
| Ebola | | GLOBAL |
| Ebola | | AFRICA |
| Ebola | | LIBERA |
| AppleEvent | Apple | US |
| AppleEvent | Apple | INDIA |

SYSTEMS AND METHODS FOR MAPPING ONLINE DATA TO DATA OF INTEREST

BACKGROUND

The present application relates generally to social media and search engine trends being mapped with user data and, more particularly, to network-based systems and methods for mapping trends emerging on social platforms and search engines with data of interest to a merchant or a company to identify a correlation between the trend and the result of the trend on data of interest to the merchant or company.

When it comes to driving traffic to your website, there are a variety of ways to attract visitors. Two of the primary ways are through social media sites and search engines. Each has their own benefits and both allow users the freedom to choose products, people, places, and things to search and/or study.

Social media or social networks are computer-mediated tools that allow people to create, share, and exchange information such as ideas, comments, and pictures/videos in a virtual community. For example, social media may be defined as a group of Internet-based applications that build on the ideological and technological foundations of the World Wide Web, and that allow the creation and exchange of user-generated content.

In some examples, social media depends on mobile and web-based technologies to create highly interactive platforms through which individuals and communities may share, co-create, discuss, and modify user-generated content. As a result of social media, changes to communication between businesses, organizations, communities, and individuals have changed. Social media differs from traditional or industrial media in many ways, including quality, reach, frequency, usability, immediacy, permanence, and the like. Social media typically operates in a dialogic transmission system, (i.e., many sources to many receivers). This is in contrast to traditional media that operates under a monologic transmission model (i.e., one source to many receivers).

Social media has been broadly defined to refer to the many relatively inexpensive and widely accessible electronic tools that enable anyone to publish and access information, collaborate on a common effort, build relationships, and the like. Internet users continue to spend more time with social media sites than any other type of site.

For example, it is estimated that over 70% of online users (which amounts to over half of the adult population of the United States of America) use at least one social media website such as FACEBOOK®, LINKEDIN®, PINTEREST®, INSTAGRAM®, TWITTER®, and TUMBLR®, to name a few. Of those who use social media, it is estimated that 70% of FACEBOOK® users visit the site daily, 49% of INSTAGRAM® users visit the site daily, and 36% of TWITTER® users visit the site daily. With many of these users posting new content, sharing content, and/or commenting on or "liking" existing content, swaths of data are being continually generated. Content that is liked and content that is popular can become content that is trending.

In addition, users are entering queries into search engines (e.g., GOOGLE®, BING®, YAHOO®, and the like) about various topics of interest. Certain topics that are frequently mentioned and/or searched within a short period of time (e.g., posts on social media and/or searches via search engines by a great number of users within a few hours or a few days) are considered to be "trending topics" or "trends." Trends may include, for example, current events of interest (e.g., sporting events, weather events, holidays), famous people (e.g., celebrities, athletes, politicians), products (e.g., a newly debuted computing device), brands, news, and the like.

Recently, there has been an increase in the use of social media monitoring tools that allow users (e.g., companies and industries) to search, track, and analyze conversations on the web about their brand, topics of interest, and the like. This information can be useful in the public relations management and campaign tracking, allowing the user to measure, for example, return on investment, competitor-auditing, and general public engagement. The monitoring tools range from free, basic applications to subscription-based, more in-depth tools. There are also monitoring tools for search engines which allow searches to be ranked based on the number of searches performed for a particular word or phrase. Here, words or phrases that are searched for quite frequently may also be determined as current trends.

However, there is nothing at present which is capable of matching current trends from social media and/or search engines with user data such as consumer spending data, consumer participation data, and the like. Therefore, there is a need in the art to have a system that facilitates the mapping and translation of real-time, real-world current trends to internal data that is of interest to users (e.g., payment processing companies; healthcare companies; political, social, educational, and/or cultural interests; law enforcement agencies; marketing agencies—which may be referred to collectively herein as "user").

BRIEF DESCRIPTION OF THE DISCLOSURE

In one aspect, a trend analysis computing device for analyzing online data, and mapping the online data to user interest data is provided. The trend analysis computing device may include (i) a receiver configured to receive online data, the online data including at least one of social media data and search engine data, (ii) a trend determiner configured to automatically determine a trend that is presently happening based on a word or a phrase being repeatedly included in the received online data, (iii) a processor configured to compare the determined trend with a dictionary database corresponding to the user to determine if the trend is of interest to the user, and, in response to determining the trend is a trend of interest, add additional data to the trend of interest based on the dictionary database, (iv) an analyzer configured to analyze the trend of interest, the added additional data, and user interest data, and generate impact data indicating an impact that the trend of interest is having on the user interest data based on the analyzing, and (v) a transmitter configured to transmit the generated impact data to the user.

In another aspect, a computer-implemented method for analyzing online data, and mapping the online data to user interest data is provided. The method may include receiving online data, the online data including at least one of social media data and search engine data, automatically determining a trend that is presently happening based on a word or a phrase being repeatedly included in the received online data, comparing the determined trend with a dictionary database corresponding to the user to determine if the trend is of interest to the user, and, in response to determining the trend is a trend of interest, adding additional data to the trend of interest based on the dictionary database, analyzing the trend of interest, the added additional data, and user interest data, and generating impact data indicating an impact that the trend of interest is having on the user interest data based on the analyzing, and transmitting the generated impact data to the user.

In another aspect, one or more computer-readable storage media having computer-executable instructions embodied thereon for analyzing online data, and mapping the online data to user interest data are provided. The computing device includes a memory device and a processor in communication with the memory device. When executed by the processor, the computer-executable instructions cause the processor to receive online data, the online data including at least one of social media data and search engine data, automatically determine a trend that is presently happening based on a word or a phrase being repeatedly included in the received online data, compare the determined trend with a dictionary database corresponding to the user to determine if the trend is of interest to the user, and, in response to determining the trend is a trend of interest, add additional data to the trend of interest based on the dictionary database, analyze the trend of interest, the added additional data, and user interest data, and generate impact data indicating an impact that the trend of interest is having on the user interest data based on the analyzing, and transmit the generated impact data to the user.

BRIEF DESCRIPTION OF THE DRAWINGS

FIG. 4 is a diagram illustrating an example of a mapping table in which a key word is mapped to a merchant and a location in accordance with an example embodiment of the present disclosure.

DETAILED DESCRIPTION OF THE DISCLOSURE

Figure 1:
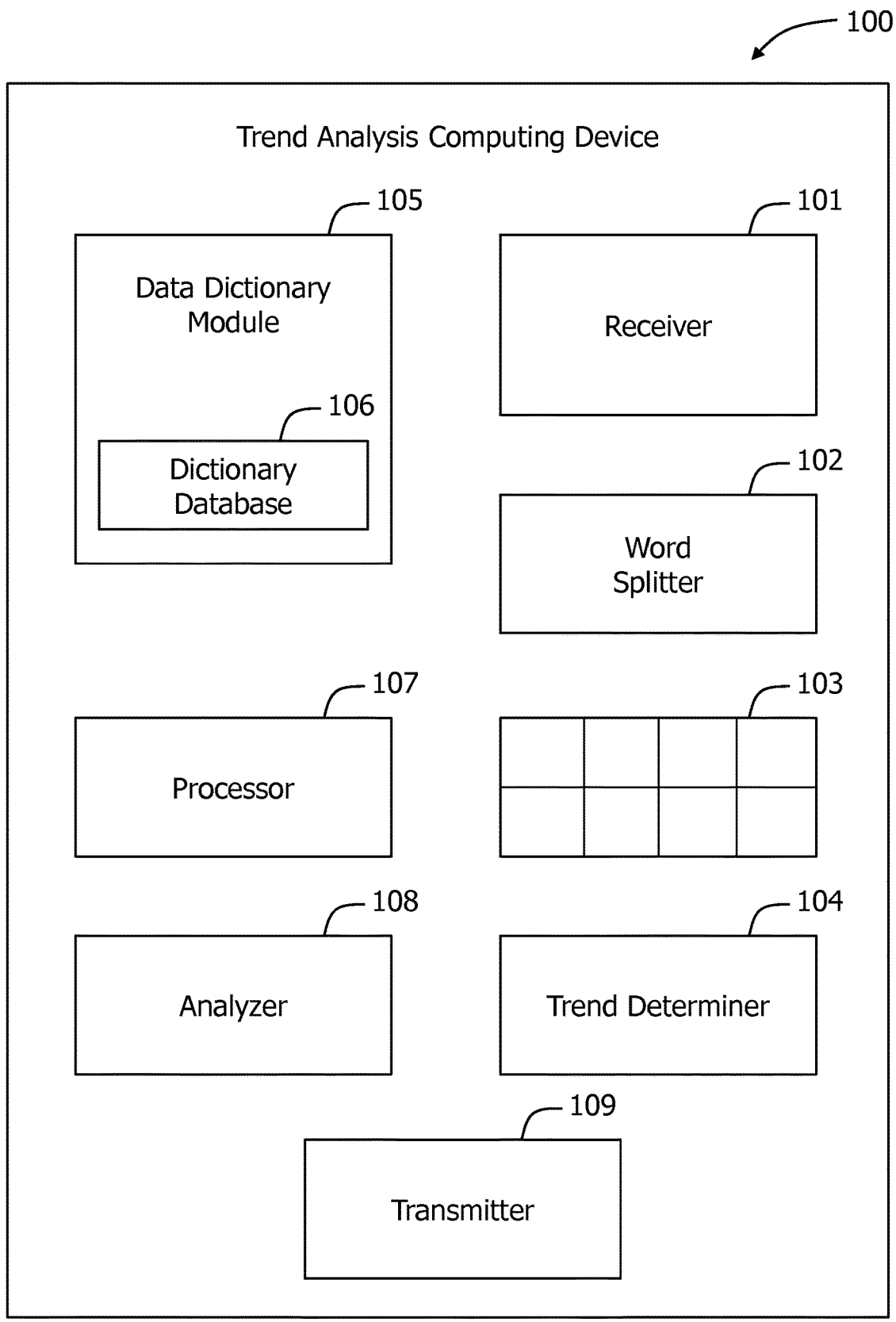
FIG. 1 is a diagram illustrating an example of trend analysis computing device in accordance with an example embodiment of the present disclosure.

Social media allows people to interact with one another through interactive platforms which enable people to share, discuss, create, and modify user generated content. More people currently get their news from social media sites than from newspapers or radio. Social media creates a more participatory experience for readers/users that read the news than before by allowing people to share news articles and comment on posts generated by others. Accordingly, social media can provide a great source of information about keywords, phrases, people, places, and things which are currently trending in the social world. There are many different social media monitoring tools available today which allow people and companies to monitor various social media data. This social media data may be used to identify key words or phrases that are currently trending (i.e., trends).

Search engines allow people to search for anything they want on the World Wide Web. For example, a person may be interested in finding a restaurant, reading the latest information about a celebrity, finding a golf course, and the like. Words and phrases that are frequently searched for within a short period of time (e.g., searches via search engines by a great number of users within a few hours or a few days) are also considered to be topics that are currently trending.

The examples described herein provide a trend analysis mapping computing device ("computing device"), system, and method for mapping current trends extracted from online data which is of interest to a particular user. For example, the online data may include at least one of social media data and search engine data. The computing device may monitor social media and search engines (i.e., online data) and collect and/or receive various information, for example, collect data using a monitoring software, receive data from a site, rank data based on popularity, and the like. Also, the user may be an entity such as a company or a merchant, or an industry including a plurality of companies and/or merchants which are included in the same industry, and the like.

A word splitter may be used to extract a word or a group of words (i.e., a phrase) from the received online data. In this example, at least one of the social media data and the search data from the online data may be processed and a record may be kept which indicates how many times a specific word or phrase has been used and/or searched for over a specific time period. If a word or phrase has been used and/or searched for more times than a predefined number of times, and within a predetermined period of time, the computing device may determine that the word or phrase is currently trending, for example, trending socially among the people using a social media sites, search engines, or some combination thereof. Here, the word or phrase may be determined as a current popular subject based on the collected online data. As a non-limiting example, it the word "snowstorm" is used more than 50 times on social media within 10 minutes, the computing device may determine that the word "snowstorm" is currently trending on social media.

According to various aspects, a word or a phrase may be converted into a basic form, in order to provide a better trend recognition. For example, plural words may also be considered in the singular form, verbs (in future or past tense) will also be considered in their present tense form, etc. and related words and synonyms also be considered. For example "man", "men", "male individual," and the like, may each be considered in the same way. As another example, when a search term is part of a bigger term (such as Manhattan is a part of New York) it may also trigger the same result in this example (here: "Manhattan snowstorm"). Accordingly, a more narrow term may be considered as an example of a broader term, such as Manhattan may be considered as New York. It should also be appreciated that a word or a phrase may be translated, for example, a language translation may be performed on a word and/or a phrase. As an example, the phrase "New York snowstorm" and "New York Schneesturm" (which is German) will both be counted in the same way.

In the examples herein, a user may refer to a merchant or an industry. If a user is aware that a certain word or phrase is currently trending, data about the trending word or phrase being correlated with respect to the user's internal data, may be helpful for the user and may be used to analyze consumer reaction or gather spending information and the like, related to the company or industry, and with respect to a particular trend. For example, merchants in industries such as the financial industry, the healthcare industry, the insurance industry, the restaurant industry, and other merchant industries, may be interested in how certain trends affect the way their customers make purchases. Accordingly, a user such as a financial company, may generate a dictionary database including a plurality of potential trends that are of interest in the financial industry with respect to consumer transactions, such as total spending information, average spending information, and the like.

In various examples, the computing device may determine that a word or a phrase is currently trending, and may compare the word or phrase that is currently trending with the dictionary database corresponding to a user. If the word or phrase is included in the dictionary database, the computing device may determine that the trend is a word or phrase of interest to the particular user. As mentioned in the above example, the user may be a financial company or a financial merchant such as a payment processor, an issuing bank, an acquiring bank, and the like, associated with a payment card such as a credit card, a debit card, and the like, or an account associated with the payment card.

Accordingly, the computing device may compare the trend with the dictionary database to determine if the trend is included in the dictionary database. The dictionary database may also include additional data or dimensions associated with a trend that may be mapped with or otherwise added to a trend of interest. For example, when the trend is included in the dictionary database (i.e., a trend of interest), the computing device may map a location, an industry sector, a group of merchants, and the like, to the trend of interest, based on data included in the dictionary database. By mapping additional data or dimensions to the trend, it may be easier for the computing device to determine internal data of the user that relates to the respective trend and provide an analysis of the additional data with respect to the trend.

The computing device also includes an analyzer for analyzing the words included in a trend of interest to the user and the additional data mapped to the trend through the dictionary database. The analyzer may automatically generate a report illustrating the impact of the trend on various information of interest, for example, a location, a merchant name, an industry type, and the like. For example, the analyzer may automatically generate a report including metrics based on the trend words and the additional data and/or dimensions added. As a non-limiting example, the report may indicate the impact or the lack of an impact of a trend with respect to transaction data of a payment card, such as, consumer spending information at a particular location, at a merchant, in an industry, and the like.

Example of a Tread Analysis Computing Device

FIG. 1 illustrates an example of trend analysis computing device in accordance with an example embodiment of the present disclosure.

Referring to FIG. 1, the trend analysis computing device 100 ("computing device 100") includes a receiver 101 that may receive online data, for example, social media data from one or more social media sources and search engine data from one or more search engines. For example, the receiver 101 may include one or more monitoring tools for listening to various social media sites and search engines. Social media and search monitoring may include software that is designed to listen to social media platforms and search engines. Users may benefit by being alerted to keyword usage, being able to respond to customer inquiries instantly, and understanding customer sentiment as it relates to their own and to competitors' brands. Social media monitoring tools have grown in recent years from purely offering listening features to include rich analytics, dashboard creation, and powerful queries with semantic analysis. Also, the receiver 101 may receive data through a wireless connection, a wired connection, or a combination thereof.

For example, the receiver 101 may receive information from at least one social media website such as FACEBOOK®, LINKEDIN®, PINTEREST®, INSTAGRAM®, TWITTER®, TUMBLR®, GOOGLE PLUS®, VK®, and the like. As another example, the receiver 101 may receive or listen to social media data from various search engines, for example, GOOGLE®, BING®, YAHOO®, ASK®, AOL®, BLEKKO®, and the like. As another example, the receiver 101 may receive information from at least one search engine such as GOOGLE®, BING®, YAHOO®, ASK®, AOL®, WOW®, and the like In some examples, the online data received by the receiver 101 may be added to a document, for example, a word document or a word file. The online data may also include a time stamp for each entry, thus enabling the computing device 100 to determine how much time has elapsed since the word or phrase was used. Also, in some examples the computing device 100 may include a word splitter 102 that may parse the document or file and determine various words that are potentially trending. For example, the word splitter 102 may split all possible word combinations, or pre-defined words and word combinations into a set of words. As another example, the word splitter may split words and word combinations into word pairs including the word or the phrase that corresponds to a trend along with a location of the trend and/or an industry of the trend. By splitting raw data into a word pair instead of merely a word, it is possible to map a trend to a location and an industry, thus resulting in two dimensions of data that may be analyzed allowing more context to be developed when only the word or phrase alone is split.

In some examples, the computing device may include a plurality of registers 103 which store a word or phrase or word pair including a word or a phrase and at least one of a location and an industry of the trend. Each register 103 may include a counter that increases by one each time a word or a phrase stored in the respective register 103 is detected in the received online data within the predetermined amount of time.

The computing device 100 may also include a trend determiner 104 configured to automatically determine a trend that is presently happening based on a word or a phrase being repeatedly included in the received online data. For example, based on the online data that is received by the receiver 101, with regard to all possible subjects and topics possible (i.e., across the board), one or more topics that are currently trending may be identified. For example, a word or a phrase that is repeated more than a predetermined number of times, and within a predetermined amount of time may be determined as a word or a phrase that is currently trending. The trend determiner 104 may detect the counter of each register 103, and any register 103 where the counter is more than a predetermined number of times, and within the predetermined amount of time may be determined as a register 103 storing a word or phrase that is currently trending. In this example, the trend determiner 104 may be used to determine any word or phrase that is trending across the board with respect to all possible topics of the online data that is received. In the alternative, the trend determiner 104 may look for specific trends based on, for example, a user input, a predefined database of trends, and the like.

As a non-limiting example, the term "super bowl" may be repeated over 1000 number of times in the online data, within a 10 minute period of time. In this example, if the predetermined threshold number of times is 100 within a predetermined period of time equal to 10 minutes, the trend determiner 104 may determine that the term "super bowl" is currently trending.

In response to a trend being identified, the trend may be compared with data of interest to a particular user. In other words, a data bridge may be created between one or more words or phrases that are currently trending and various user interest data. To bridge the trending words and the user interest data, a dictionary database 106 may store a plurality of words or phrases (i.e. potential trends) that are of interest to a particular user, merchant, location, industry, and the like. For example, the plurality of words of interest may be generated by a data dictionary module 105 that may include the dictionary database 106 for a particular user, merchant, location, industry, and the like. Here, the dictionary database 106 may include a plurality of potential trends of interest that were previously generated and that are contextually mapped to internal data of the user. As an example, the user may be a merchant, company, person, and the like, and the impact data may be generated based on at least one of a location of the trend, a name of the merchant, and an industry of the merchant. The data dictionary module 105 may generate the dictionary database 106, for example, based on a type of industry of the user, inputs by the user, predetermined settings, and the like.

In some examples, the trend determiner 104 may automatically determine that a trend is not included in the dictionary database 106 corresponding to the user. In this case, the trend may be dropped. However, if the word or the phrase corresponding to the trend not included in the dictionary database 106 is repeated more than a second predetermined number of times and within the predetermined amount of time, the trend determiner 104 may determine to add the trend to the dictionary database 106 corresponding to the user to indicate that the trend is now of interest to the user. In this example, the second predetermined number of times is greater than the first predetermined number of times. Therefore, if a new and suddenly popular topic reaches a greater popularity than a mere trend, (i.e., a super trend), the trend determiner 104 may determine that such a topic is so popular that it may be added to the dictionary database 106.

The trend analysis computing device 100 may include a processor 107 that compares a current trend determined by the trend determiner 104 to the potential trends of interest that are stored in the dictionary database 106. If the current trend is not included in the dictionary database 106, no further analyzing may be performed, or additionally analyzing may be performed to determine whether to add the current trend to the dictionary database 106. However, if the current trend is included in the dictionary database 106, the processor 107 may determine that the current trend is of interest to the user. In response to determining that a current trend is of interest to the user, the processor 107 may add additional data to the trend of interest. For example, the additional data added by the processor 107 to the trend may include at least one of a location identification where the trend is happening, a merchant name ID, and a type of industry including the merchant.

The trend analysis computing device 100 further includes an analyzer 108. The analyzer 108 may analyze the data that has been collected, for example, the trend of interest, the added additional information, and the user interest data. Based on the analyzed data, the analyzer 108 may generate impact data which indicates an impact that the trend of interest is having on the user interest data. That is, the analyzer may correlate the trend of interest and the additional data with a topic of interest with a user. By adding the additional data to the trend of interest and further analyzing the additional data, the analyzer 108 may further analyze the trend by comparing it along with the additional data to the user interest data. As an example, the user may be a merchant. In this example, the impact data may include the impact of the trend with respect to transaction data with respect to a particular product of the merchant and the impact of the trend with respect to transaction data of the particular product at a location of the trend.

For example, the user may be a payment processor, and the impact data may be generated based by comparing the trend with data that is included in a plurality of transactions processed by the payment processor, to determine whether the trend has affected the transactions. For example, a trend may cause a product or service sold by a merchant to receive more or less transactions. As another example, a trend may cause a product or service sold at a particular location to receive more or less transactions. A payment processor may be included in the financial industry, and may be interested in how trends affect spending. Accordingly, the impact data generated for the payment processor by the analyzer 108 may include at least one of a total amount spent on a plurality of transactions, a total number of transactions, and a total number of accounts used for authorizing the plurality of transactions, over a predetermined amount of time, for at least one of a particular location, a particular merchant, and a particular industry. As another example, the impact data may include at least one of an average amount spent per transaction and an average amount spent per account, over a predetermined amount of time, for at least one of a particular location, a particular merchant, and a particular industry.

While a payment processor and transaction data is one example of the type of merchant or company that may be interested in gathering data from the trend analysis computing device, it should also be appreciated that this is merely for purposes of example, and the amount of merchants and companies that may be interested in the trend analysis computing device 100 is unlimited. It should also be appreciated that the dictionary database 106 can be dynamically adjusted based on the merchant, company, industry, location, and the like, that the trend analysis computing device is used to analyze. Also, the user interest data may be dynamically changed based on the user such as the type of industry that the user is in. For example, user interest data may include one or more other data that a merchant may be interested in, for example, airport data, grocery store data, restaurant data, hotel data, leisure activity data, banking data, public transportation data, clothing store data, furniture store data, automobile sales data, and the like. It should be appreciated that the impact or lack of impact that a trend has on any type of user interest data may be determined.

The trend analysis computing device 100 may further include a transmitter 109 that may transmit the impact data to at least one of an internal database of a user, or to a third party. For example, the computing device 100 may correspond to a payment processor. In this example, the transmitter 109 may transmit the impact data to an internal database or an internal tool of the payment processor, thus enabling the payment processor to identify data of interest to the payment processor that may be impacted or otherwise affected by the current trends.

As another example, a user may sell the impact data as an information product. The information product could be sold to third parties and the dictionary database could be dynamically adjusted based on trends of interest to the third party. For example, a payment processor may sell the impact data determined by the trend analysis computing device 100 to third party clients, such as merchants, issuing banks, acquiring banks, and the like. Accordingly, the transmitter 109 may transmit the generated impact data to the third party clients based on their interests.

As a non-limiting example, a potential trend could be a product sold or otherwise provided by a merchant, for example, APPLE PAY® that is an application provided by APPLE®. The trend determiner 104 may determine that APPLE PAY® is used at least a predetermined number of times within a predetermined period of time, and therefore, is a trend of interest. Also, the processor 107 may determine that APPLE PAY® is a trend of interest stored in the dictionary database 106 corresponding to a payment processor user. Next, the analyzer 108 may analyze the APPLE PAY® transactions and determine that the trend of APPLE PAY® has impacted transactions by increasing transactions paid for using APPLE PAY® by 50% from the previous month or week. The transmitter 109 may transmit this impact information to the payment processor. In this example, the payment processor can use this impact information to suggest to clients to get a payment device that accepts APPLE PAY®.

As another example, the impact data could be sold to a third party as an information product. In this example, rather than give the third party specific transaction details, the impact data could be anonymized or aggregated and transmitted to the third party to prevent the third party from receiving specific transaction information details of another merchant, and the like.

Example of Trend Analysis Method

Figure 2:
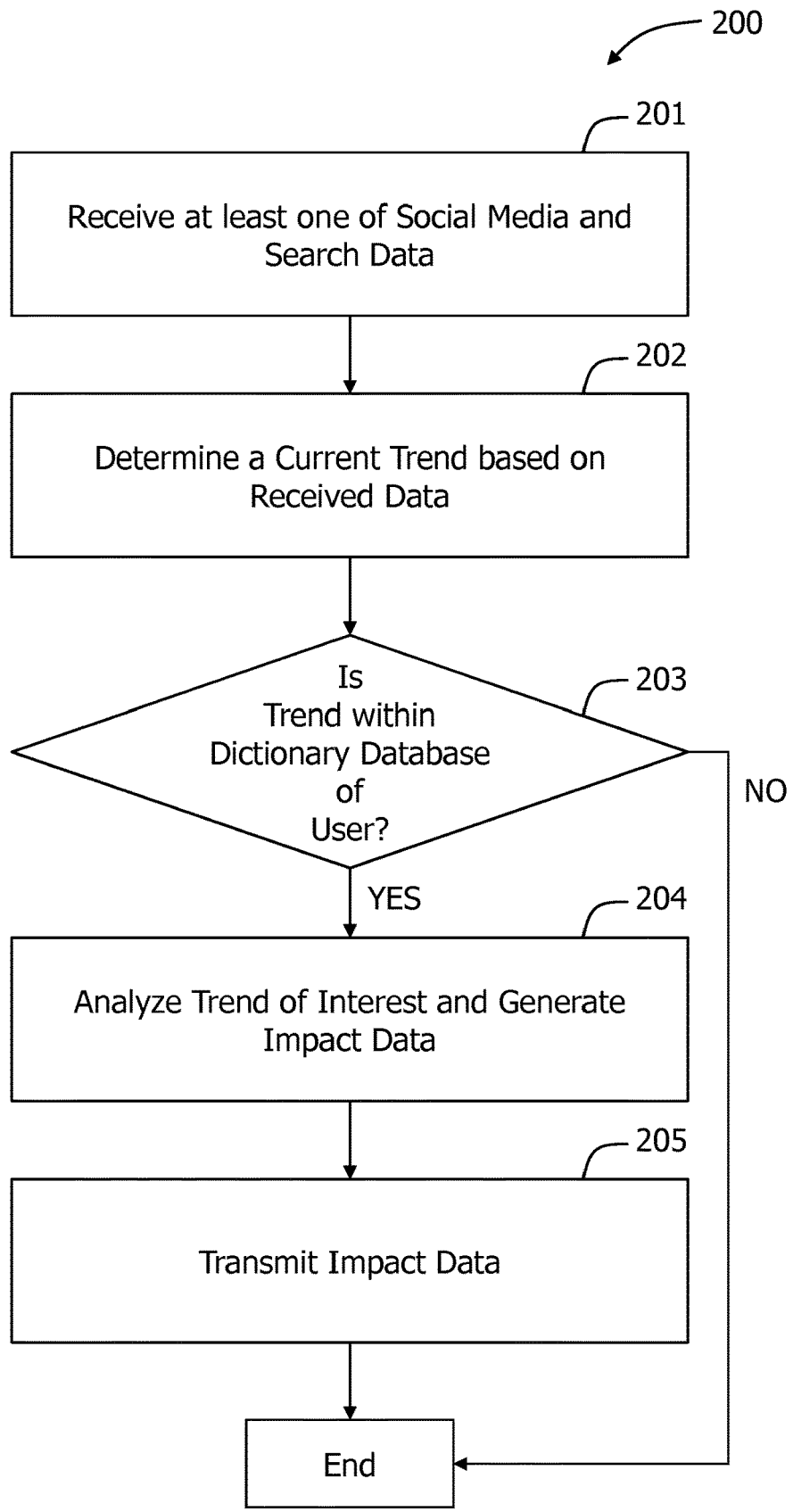
FIG. 2 is a diagram illustrating an example of a method for analyzing online data trends and mapping the online data to user interest data according to an example embodiment of the present disclosure.

FIG. 2 illustrates an example of a method for analyzing online; data and mapping the online data to user interest data according to an example embodiment of the present disclosure.

Referring to FIG. 2, a computer-implemented method for analyzing online data and mapping or otherwise relating it to user interest data 200 is illustrated. In 201, the method includes receiving online data including at least one of social media and search engine data, and in 202, the method further includes automatically determining a trend that is presently happening based on a word or a phrase being repeatedly included in the received online data. For example, the online data may include data received from one or more social networking websites and data received from one or more search engines. The online data may be stored in a file or an application, and may be parsed to generate words and phrases that could potentially be trends. In 202, the method may determine a word or a phrase that has been repeated within the online data more than a predetermined number of times and within a predetermined period of time, as a current trend.

Although not shown in FIG. 2, the automatically determining may further include splitting the online data into words and phrases, and storing a trend corresponding to a word or a phrase in a respective register. Also, the automatically determining may further include increasing a count of a register each time a respective trend stored therein is detected in the received online data within a predetermined amount of time.

In some examples, the automatically determining in 203 may include determining that a trend is not included in the dictionary database corresponding to the user. In this example, the trend may be dropped and the method may end. However, as another example, in response to the word or the phrase corresponding to the trend that is not in the dictionary database happening more than a second predetermined number of times and within the predetermined amount of time, the method may further include determining to add the trend to the dictionary database corresponding to the user to indicate that the trend is now of interest to the user. In this example, the second predetermined number of times is greater than the first predetermined number of times, for example, by twice as much, three times as much, four times as much, and the like. In this example, the method can advance to operation 204 because the trend is now included as a trend of interest.

Also, in 203, the method includes comparing the determined trend with a dictionary database corresponding to the user. That is, the dictionary database corresponding to the user may comprise of topics that are of interest to the user, for example, a list of words or phrases that the user considers to be of interest. In various examples, the dictionary data may include a plurality of topics that are contextually mapped to internal data of the user. Also, the dictionary database may be created ahead of time. Also in 203, in response to determining that a trend is a trend of interest by matching the trend to a word or phrase previously stored in the dictionary database or that is added right there to the dictionary database, the method further includes adding additional data to the trend of interest based on additional data stored in the dictionary database. For example, the additional data may be mapped to the trend of interest and may include, as a non-limiting example, a location of the trend, a merchant name, and an industry type.

In 204, the method further includes analyzing the determined trend of interest, the added additional data, and user interest data, and generating impact data indicating an impact that the trend of interest is having on the user interest data based on the analysis. In 205, the method includes transmitting the generated impact data to the user.

As a general example, the user may include a merchant, and the impact data may be generated based on at least one of a location of the trend, a name of the merchant, and an industry of the merchant. For example, the user may be a medical merchant such as a hospital, a healthcare provider, a health insurance company, and the like, which are included in the health industry. In this example, the user interest data may be data associated with a rise or decrease in various healthcare fields, for example, the amount of hospital visits, average hospital stay, average insurance costs, total insurance costs, and the like. For example, if the trend is the word "Ebola," such a trend may be analyzed and compared with data of interest to the medical merchant to provide information about the effect that the trend of Ebola is having on various medical merchant data. As another example, the user may include a payment processor, and the impact data may be generated based on data included in a plurality of transactions processed by the payment processor, for example, a rise or fall in the total amount of transactions, total amount spent, total number of accounts used, average amount spent, average amount spent per transaction, and the like. According to various examples, the impact data may be gathered over a predetermined period or range of time for at least a location, a merchant, and/or an industry.

In 205, the method includes transmitting the impact data to the user. For example, the transmitting 205 may include transmitting the impact data to at least one of an internal database of a payment processor and product purchased by a third-party client of the payment processor.

Example of Another Trend Analysis Computing Device

Figure 3:
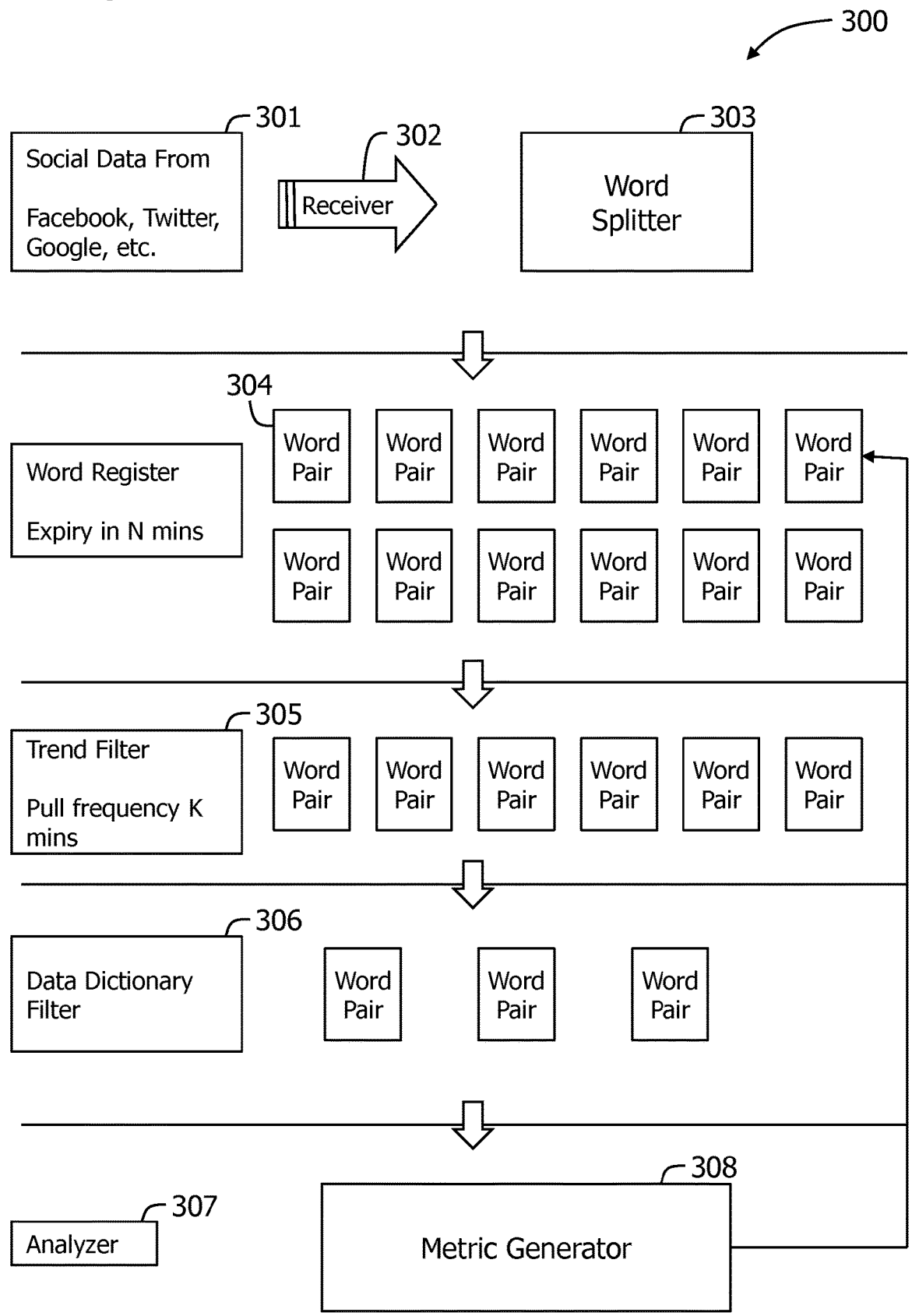
FIG. 3 is a diagram illustrating another example of trend analysis computing device in accordance with another example embodiment of the present disclosure.

FIG. 3 illustrates another example of trend analysis computing device in accordance with another example embodiment of the present disclosure.

Referring to FIG. 3, the trend analysis computing device 300 includes a receiver 302 that receives online data that includes at least one of social media data and search engine data 301 from one or more social media and/or search engine sites. The receiver 302 then transmits the received online data 301 to a word splitting module 303. The word splitting module 303 may determine one or more words or phrases from the received online data, and also the number of times the words and/or phrases are repeated over a predetermined amount of time.

In this example, the word splitting module 303 stores the words and/or phrases as word pairs in an array of registers 304 which includes a plurality of registers 304. The word pairs may include the word or phrase of the trend, as well as a location of the trend and a merchant or industry associated with the trend. In this example, the word splitting module 303 may store twelve word pairs in twelve respective registers 304. In some examples, a word pair stored in a register 304 may expire after the predetermined amount of time elapses. For example, the predetermined amount of time may be ten minutes. When the ten minutes elapses, the word pair included in a register for the ten minutes expires. In this example, the trend filter module 305 may detect the number of times a word included in a word pair is used in the online data. If the word included in the word pair has not been detected at least the predetermined number of times within the ten minutes, the word may be dropped by the trend filter module 305 as not being a trend. However, if the word has been detected at least the predetermined number of times, the word may be determined as a trend.

In this example, six of the twelve word pairs are determined by the trend filter module 305 to exceed the predetermined number of times within the predetermined period of time. Accordingly, six words corresponding to the six word pairs are transmitted to the data dictionary filter 306 as potential trends of interest. In this example, the data dictionary filter 306 may compare each of the six potential trends of interest with topics that are stored in a data dictionary database. If a potential trend matches a topic stored in the data dictionary database, the trend is determined to be a trend of interest to the user. In this example, three of the six potential trends are determined to be trends of interest to a user. In response to determining that a trend is a trend of interest to the user, the data dictionary filter 306 may then add additional data to the trend, to generate more information to be analyzed and that is related to the trend.

The analyzer module 307 may analyze the data that has been collected, for example, the trend of interest, the added additional information, and the user interest data. Based on the analyzed data, the analyzer module 307 may generate impact data which indicates an impact that the trend of interest is having on the user interest data. In this example, the analyzer uses a metric generator module to determine various metrics of data with respect to the trend of interest and the additional data. As an example, the user may be a merchant. In this example, the impact data may include metrics of the trend with respect to transaction data with respect to a particular product of the merchant and metrics of the trend with respect to transaction data of the particular product at a location of the trend.

As a non-limiting example, one potential trending phrase may be determined as there is a snow blizzard in New York. In this example, the word splitting module 303 may split the phrase into the words (New York, snow, and blizzard) and stores these words in a register 304. The trend filter 305 may determine that the words (New York, snow, and blizzard) are used in a sentence or near each other in at least a predetermined number of times in the online data, within the predetermined period of time. Accordingly, the trend filter 305 may determine (New York, snow, and blizzard) as a potential trend of interest. Next, the data dictionary module 306 may compare the words (New York, snow, and blizzard) to a dictionary database and determine that the words New York maps to snow, and therefore, (New York, and snow) is a trend of interest to the user. Accordingly, the analyzer 307 may use the metric generator module 308 to generate metrics related to the trend of New York and snow with respect to user interest data of a user.

Figure 5:
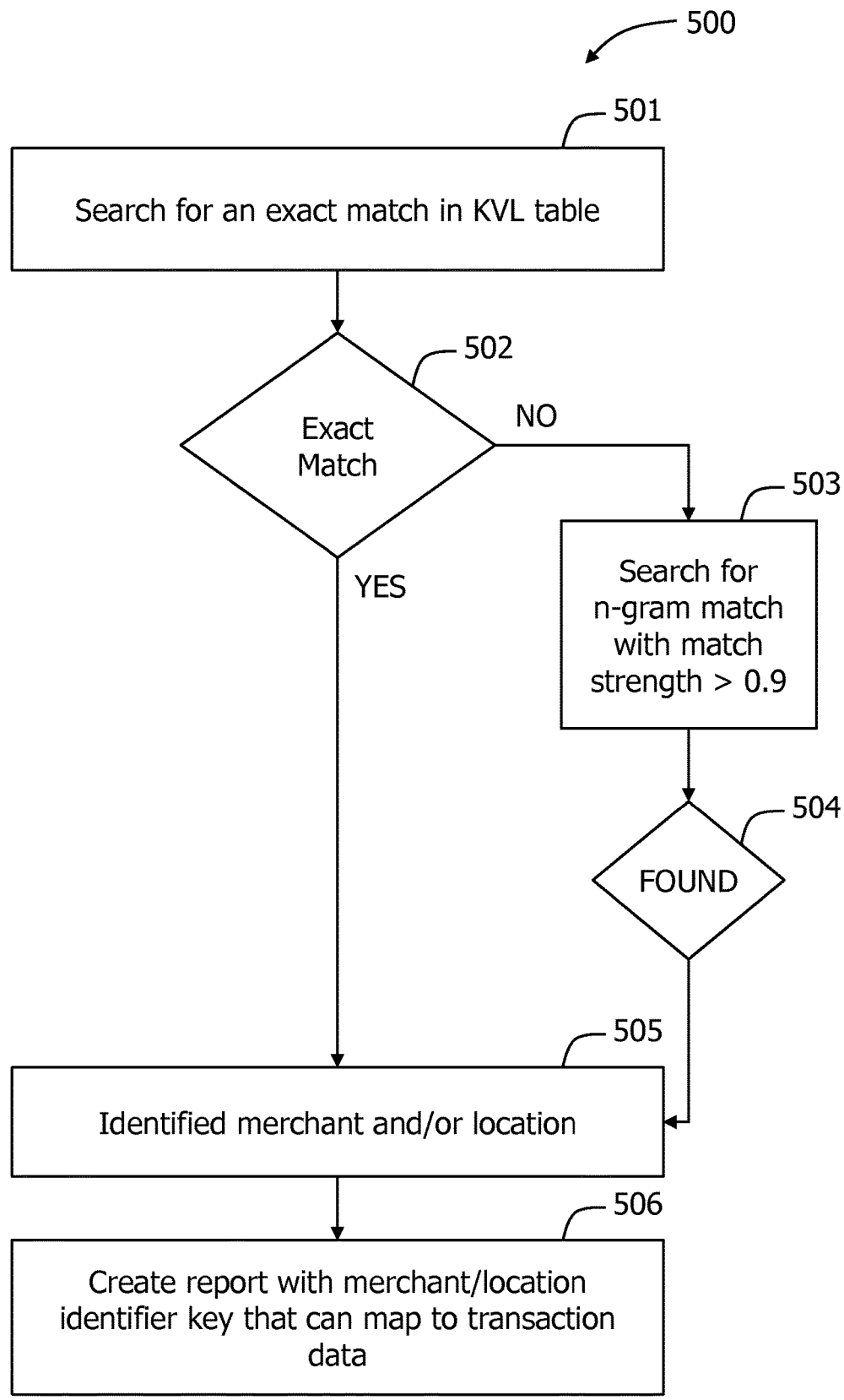
FIG. 5 is a diagram illustrating an example of a method for trend analysis which uses the table illustrated in FIG. 4, in accordance with an example embodiment.

Example of Mapping Table for Use by the Analyzer and Method Using the Mapping Table FIG. 4 illustrates an example of a mapping table 400 in which a key word such as a trend is mapped to a merchant name and a location, and FIG. 5 illustrates an example of a method for trend analysis that uses the table illustrated in FIG. 4, in accordance with example embodiments of the present disclosure.

Referring to FIG. 4, the table 400 includes three variables mapped with each other. In this example, variable K 401 corresponds to a keyword that is trending, variable V 402 corresponds to a value of a merchant related to the keyword that is trending, in other words, a merchant's name, and variable L 403 corresponds to a location at which the trend K is occurring. Accordingly, for each keyword K, a merchant value V and a location of the trend L may be mapped thereto. Furthermore, the table may include an entry for every unique combination of K, V, and L.

In this example, the first keyword K is the trend iPadAir2, that is, K is equal to iPadAir2. The merchant name (V) that corresponds to iPadAir2 is Apple, and the location of the trend is globally. Accordingly, this information can be reflected in the three fields of the KVL table.

The second keyword K is the trend Ebola. In this example, there is no merchant that corresponds to the disease of Ebola, and therefore the merchant name field (V) is left blank. Also, the trend of Ebola is currently occurring in three different locations, therefore, Ebola has three separate entries in the KVL table to include an entry for every unique combination of Ebola, and the locations of Global, Africa, and Liberia.

The third keyword K is the trend AppleEvent. In this example, the merchant name that corresponds to the keyword AppleEvent is Apple. Accordingly, the merchant name (V) has a value of Apple. Also, in this example, the keyword AppleEvent is trending in two locations, US and India, and therefore AppleEvent includes two entries in the KVL table to cover each unique combination of KVL.

FIG. 5 illustrates a method for trend analysis 500 that may be performed using the table illustrated in FIG. 4. Referring to FIG. 5, for each trend that is identified, the trend T can be processed by method 500. In response to receiving a trend, in 501 the method includes searching the KVL table for an exact match with respect to K, V, and L, in other words, a keyword in the trend (K), a merchant name (V), and a location (L) that is an exact match to a newly identified trend (T).

In 502, the method includes determining whether there is an exact match for the trend (T) in the KVL table. In response to determining that there is not an exact match in the KVL table, the method advances to 503, where an n-gram match with at least a match strength of 0.9 is searched for in the KVL table. In 504, the method includes finding an n-gram match that is at least a match strength of 0.9 and the method advances to 505. If the method determines that there is an exact match in 502, the method skips steps 503 and 504, and advances directly to step 505.

In 505, the method includes determining that a merchant and a location have been identified. In 506, the method includes creating a report with a merchant and a location identifier that corresponds to the trend T that can be mapped to transaction data, for example, transaction data of a payment card such as a debit card, a credit card, an account number corresponding to the payment card, and the like. As another example, the report may include information, in addition to or other than the transaction data such as the impact of the trend on other data that a merchant may be interested in, for example, airport data, grocery store data, shopping data, restaurant data, hotel data, leisure activities data, banking data, public transportation data, clothing store data, furniture store data, automobile sales data, and the like.

Figure 6:
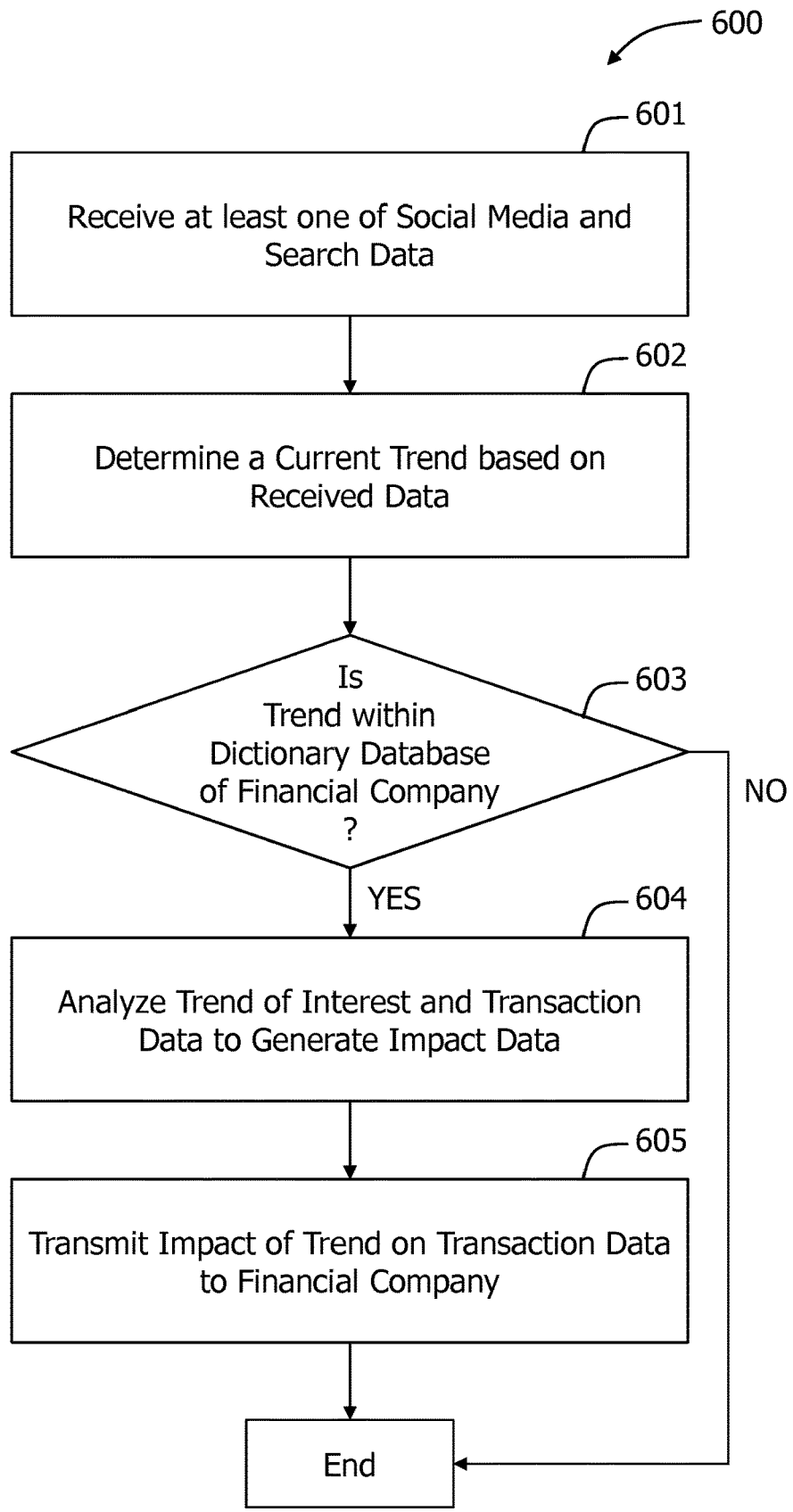
FIG. 6 is a diagram illustrating an example of a method for analyzing at online data trends and relating them to transaction data of a financial company according to an example embodiment of the present disclosure.

Example of Trend Analysis Method with Respect to Transaction Data of a Financial Company FIG. 6 is a diagram illustrating an example of a method for analyzing online data trends and relating them to transaction data of a financial company according to an example embodiment of the present disclosure.

Referring to FIG. 6, in this example, the operations that are performed in reference numeral 601 and 602, are the same as those performed in 201 and 202, as discussed in the example of FIG. 2. Therefore, for convenience and brevity, additional redundant description of these operations is omitted.

In response to determining one or more potential trends in 602, the method 600 performs a comparison between the one or more potential trends and a dictionary database corresponding to a financial company in 603. In this example, the financial company may be a payment processor, an issuing bank, an acquiring bank, a lending bank, an insurance company, and the like. If none of the potential trends are included in the dictionary database comparison in 603, the method may terminate. As another example, if at least one of the trends is included in the dictionary database in 603, the method moves to step 604 to further analyze the trend of interest. Prior to advancing to the analyzing operation, the method may include adding additional information to the trend based on data stored in the dictionary database that is mapped to the trend of interest. For example, the additional data may include a location, a merchant name, an industry type, and the like.

In 604, the trend of interest and the additional data are analyzed in comparison to transaction data of the financial company to determine an impact of the trend with respect to the transaction data of the financial company. For example, various fields of the transactions which are of interest to the financial company may be analyzed to determine if the trend has had an impact on the fields. For example, the impact data may include a total amount spent on a plurality of transactions at a location, at a merchant, and/or in a particular industry, a total number of transactions at a location, at a merchant, and/or in a particular industry, and a total number of accounts used for authorizing the plurality of transactions at a location, at a merchant, and/or in a particular industry. The total transaction data may be determined based on transactions that occur over a predetermined period of time, for example, 5 minutes, 10 minutes, an hour, and the like.

As another example, the impact data may include at least one of an average amount spent per transaction at a location, at a merchant, and/or in a particular industry, an average amount spent per account at a location, at a merchant, and/or in a particular industry, and the like. In this example, the average transaction data may be determined based on transactions that occur over a predetermined amount of time.

After determining the impact of the trend or the lack of impact of the trend with respect to the transaction data, the method further includes transmitting a result of the impact data to the financial company, in 605. By gathering data about how current trends affect transaction data, a financial company may have a better idea of how future trends may affect transaction data, and sales. This information may be useful to increase or decrease inventory at particular merchants when it is determined that sales of particular products will increase or decrease, thus, more efficiently handling consumer supply and demand.

As will be appreciated based on the foregoing specification, the above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed examples of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Additional Considerations

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal"

refers to any signal used to provide machine instructions and/or data to a programmable processor.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

For example, one or more computer-readable storage media may include computer-executable instructions embodied thereon for determining the likelihood of an authorized transaction resulting in a chargeback. In this example, the computing device may include a memory device and a processor in communication with the memory device, and when executed by said processor the computer-executable instructions may cause the processor to perform a method such as the method described and illustrated in the examples of FIG. 2 and FIG. 5.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example, the system is executed on a single computer system, without a connection to a server computer. In a further example, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A trend analysis computing device for analyzing online data, and mapping the online data to user interest data, the trend analysis computing device communicatively coupled to at least one social media source, at least one search engine, and a payment processor that processes a plurality of payment card transactions, the trend analysis computing device comprising:

a receiver configured to receive online data from the at least one social media source and the at least one search engine, the online data comprising at least one of social media data and search engine data;

a word splitter configured to parse the online data to extract a plurality of words and phrases from the online data;

a plurality of registers, each register configured to store a unique word or phrase extracted from the online data and configured to increment a counter each time an instance of the unique word or phrase is extracted from the online data;

a trend determiner configured to automatically monitor the plurality of registers to determine that a trend that is presently happening for a particular word or phrase when a counter for a register storing the particular word or a phrase exceeds a first predetermined number;

a dictionary data filter configured to compare the determined trend with a dictionary database corresponding to the user to determine if the trend is of interest to the user, and, in response to determining the trend is a trend of interest, add to the trend of interest a geographic trend location where the trend is occurring;

an analyzer configured to:
retrieve, from the payment processor, user interest data, wherein the user interest data includes payment card transaction data for a particular product; and
analyze a combination of the trend of interest, the geographic trend location, and the payment card transaction data for the particular product at the geographic trend location to generate impact data indicating an impact that the trend of interest is having on the payment card transaction data for the particular product at the geographic trend location; and a transmitter configured to transmit the generated impact data to the user to assist the user in predicting how future trends will affect future transaction data.

2. The trend analysis computing device of claim 1, wherein the user comprises a merchant, and the impact data is generated based on a name of the merchant.

3. The trend analysis computing device of claim 1, wherein the user comprises the payment processor.

4. The trend analysis computing device of claim 1, wherein the impact data comprises at least one of a total amount spent on a plurality of transactions, a total number of transactions, and a total number of accounts used for authorizing the plurality of transactions, over a predetermined amount of time, for at least one of a particular location, a particular merchant, and a particular industry, and the impact data further comprises an average amount spent per transaction for a particular location and a particular merchant.

5. The trend analysis computing device of claim 1, further comprising a data dictionary module configured to generate the dictionary database corresponding to the user, wherein the dictionary database comprises a plurality of potential trends of interest that are contextually mapped to internal data of the user.

6. The trend analysis computing device of claim 1, wherein the trend determiner is configured to automatically determine that a trend is presently happening when the counter exceeds the first predetermined number within a predetermined period of time.

7. The trend analysis computing device of claim 6, wherein the trend determiner is configured to automatically determine that the trend is not included in the dictionary database corresponding to the user, and in response to the counter exceeding a second predetermined number within the predetermined amount of time, determine to add the trend to the dictionary database corresponding to the user to indicate that the trend is now of interest to the user, the second predetermined number being greater than the first predetermined number.

8. The trend analysis computing device of claim 1, wherein the impact data comprises the impact of the trend with respect to transaction data of a merchant.

9. The trend analysis computing device of claim 1, wherein the transmitter is configured to transmit the impact data to an internal database of the same payment processor that the payment card transaction data for the particular product was retrieved from.

10. A computer-implemented method for analyzing online data, and mapping the online data to user interest data, the method performed using a trend analysis computing device communicatively coupled to at least one social media source, at least one search engine, and a payment processor that processes a plurality of payment card transactions, the method comprising:

receiving, at a receiver of the trend analysis computing device, online data from the at least one social media source and the at least one search engine, the online data comprising at least one of social media data and search engine data;

parsing, using a word splitter of the trend analysis computing device, the online data to extract a plurality of words and phrases from the online data;

storing, in a plurality of registers of the trend analysis computing device, the extracted plurality of words and phrases, wherein each register stores a unique word or phrase and increments a counter each time an instance of the unique word or phrase is extracted from the online data;

automatically determining, using a trend determined of the trend analysis computing device, a trend that is presently happening by monitoring the plurality of registers and determining that a counter for a register storing a particular word or a phrase exceeds a first predetermined number;

comparing, using a dictionary data filter of the trend analysis computing device, the determined trend with a dictionary database corresponding to the user to determine if the trend is of interest to the user, and, in response to determining the trend is a trend of interest, adding to the trend of interest a geographic trend location where the trend is occurring;

retrieving, using an analyzer of the trend analysis computing device, user interest data from the payment processor, wherein the user interest data includes payment card transaction data for a particular product;

analyzing, using the analyzer, a combination of the trend of interest, the geographic trend location, and the payment card transaction data for the particular product at the geographic trend location to generate impact data indicating an impact that the trend of interest is having on the payment card transaction data for the particular product at the geographic trend location; and transmitting the generated impact data to the user.

11. The computer-implemented method of claim 10, wherein the user comprises a merchant, and impact data is generated based on at least one of a name of the merchant and an industry of the merchant.

12. The computer-implemented method of claim 10, wherein the user comprises the payment processor.

13. The computer-implemented method of claim 10, wherein the impact data comprises at least one of a total amount spent on a plurality of transactions, a total number of transactions, and a total number of accounts used for authorizing the plurality of transactions, over a predetermined amount of time, for at least one of a particular location, a particular merchant, or a particular industry, and the impact data further comprises at least one of an average amount spent per transaction and an average amount spent per account, over a predetermined amount of time, for at least one of a particular location, a particular merchant, or a particular industry.

14. The computer-implemented method of claim 10, further comprising generating the dictionary database corresponding to the user, wherein the dictionary database comprises a plurality of trends that are contextually mapped to internal data of the user.

15. The computer-implemented method of claim 10, wherein the automatically determining comprises determining that a trend is presently happening when the counter exceeds the first predetermined number within a predetermined period of time.

16. The computer-implemented method of claim 15, wherein the automatically determining comprises determining that an additional trend is not included in the dictionary database corresponding to the user, and in response to counter associated with the word or the phrase corresponding to the additional trend exceeding a second predetermined number within the predetermined amount of time, determining to add the trend to the dictionary database corresponding to the user to indicate that the trend is now of interest to the user, the second predetermined number being greater than the first predetermined number.

17. The computer-implemented method of claim 10, wherein the impact data comprises the impact of the trend with respect to transaction data of a merchant.

18. The computer-implemented method of claim 10, wherein the transmitting comprises transmitting the impact data to at least one of an internal database of the payment processor and a third-party client of the payment processor.

19. One or more computer-readable storage media having computer-executable instructions embodied thereon for analyzing online data, and mapping the online data to user interest data, wherein the computer-readable storage media is included in a trend analysis computing device communicatively coupled to at least one social media source, at least one search engine, and a payment processor that processes a plurality of payment card transactions, and wherein when executed by, the computer-executable instructions cause the trend analysis computing device to:
  receive, at a receiver of the trend analysis computing device, online data from the at least one social media source and the at least one search engine, the online data comprising at least one of social media data and search engine data;
  parse, using a word splitter of the trend analysis computing device, the online data to extract a plurality of words and phrases from the online data;
  store, in a plurality of registers of the trend analysis computing device, the extracted plurality of words and phrases, wherein each register stores a unique word or phrase and increments a counter each time an instance of the unique word or phrase is extracted from the online data;
  automatically determine, using a trend determined of the trend analysis computing device, a trend that is presently happening by monitoring the plurality of registers and determining that a counter for a register storing a particular word or a phrase exceeds a first predetermined number;
  compare, using a dictionary data filter of the trend analysis computing device, the determined trend with a dictionary database corresponding to the user to determine if the trend is of interest to the user, and, in response to determining the trend is a trend of interest, add to the trend of interest a geographic trend location where the trend is occurring;
  retrieve, using an analyzer of the trend analysis computing device, user interest data from the payment processor, wherein the user interest data includes payment card transaction data for a particular product;
  analyze, using the analyzer, a combination of the trend of interest, the geographic trend location, and the payment card transaction data for the particular product at the geographic trend location, to generate impact data indicating an impact that the trend of interest is having on the payment card transaction data for the particular product at the geographic trend location; and
  transmit the generated impact data to the user.

* * * * *